(12) United States Patent
Lehman et al.

(10) Patent No.: US 11,339,595 B2
(45) Date of Patent: May 24, 2022

(54) REMOVABLE DOOR AND HINGE SYSTEM THEREFOR

(71) Applicant: Lippert Components, Inc., Elkhart, IN (US)

(72) Inventors: David A. Lehman, Lancaster, PA (US); Scott C. McKinnon, Union City, MI (US); David Wysong, Goshen, IN (US)

(73) Assignee: Lippert Components, Inc., Elkhart, IN (US)

( * ) Notice: Subject to any disclaimer, the term of this patent is extended or adjusted under 35 U.S.C. 154(b) by 751 days.

(21) Appl. No.: 16/276,713

(22) Filed: Feb. 15, 2019

(65) Prior Publication Data
US 2019/0249474 A1 Aug. 15, 2019

Related U.S. Application Data

(60) Provisional application No. 62/631,240, filed on Feb. 15, 2018.

(51) Int. Cl.
*E05D 7/10* (2006.01)
*E05D 3/02* (2006.01)
*B60J 5/00* (2006.01)

(52) U.S. Cl.
CPC ............. *E05D 7/1072* (2013.01); *E05D 3/02* (2013.01); *E05D 7/1044* (2013.01); *B60J 5/00* (2013.01); *E05Y 2900/132* (2013.01); *E05Y 2900/531* (2013.01)

(58) Field of Classification Search
CPC ............. Y10T 16/524; Y10T 16/536; Y10T 16/53605; Y10T 16/53607; Y10T 16/53613; Y10T 16/53615; E05D 7/1072; E05D 7/1077; E05D 7/12; E05D 7/121; E05D 7/1044; E05D 7/105; E05D 7/1055; E05D 7/1061; E05D 2007/126; E05D 2007/128; E05D 3/02; E05Y 2900/132; E05Y 2900/50; E05Y 2900/531; B60J 5/00

See application file for complete search history.

(56) References Cited

U.S. PATENT DOCUMENTS

| | | | | |
|---|---|---|---|---|
| 3,059,271 A | * | 10/1962 | Erickson | E05D 7/1061 16/261 |
| 3,166,367 A | * | 1/1965 | Vincens | E05D 7/1016 16/229 |
| 3,828,394 A | * | 8/1974 | Horgan, Jr. | E05D 5/0246 16/241 |
| 3,975,793 A | | 8/1976 | Just | |

(Continued)

FOREIGN PATENT DOCUMENTS

| | | | | |
|---|---|---|---|---|
| CN | 2152877 Y | * | 1/1994 | |
| EP | 415868 A | * | 3/1991 | E05D 1/04 |

(Continued)

*Primary Examiner* — Chuck Y Mah
(74) *Attorney, Agent, or Firm* — Nixon & Vanderhye P.C.

(57) ABSTRACT

A hinge system includes first and second hinge assemblies. The first hinge assembly includes a first hinge plate with a post and a second hinge plate with a collar configured to selectively receive the post. The second hinge assembly includes a third hinge plate with a counter bore and a keyway and a fourth hinge plate with a key configured to be selectively received within the keyway and the counter bore.

16 Claims, 5 Drawing Sheets

(56) References Cited

U.S. PATENT DOCUMENTS

| | | | |
|---|---|---|---|
| 4,001,973 A | 1/1977 | Rice et al. | |
| 4,009,507 A * | 3/1977 | Lascarrou | E05D 7/12 16/265 |
| 4,072,333 A | 2/1978 | Hutter, III | |
| 4,413,373 A | 11/1983 | Sasaki | |
| 5,008,975 A * | 4/1991 | Wang | E05D 7/10 16/386 |
| 5,327,682 A | 7/1994 | Holtz | |
| 5,530,992 A * | 7/1996 | Baermann | E05D 15/505 49/382 |
| 5,911,264 A * | 6/1999 | Smrke | E05D 7/1077 16/258 |
| 6,000,771 A * | 12/1999 | Wissinger | F25D 23/02 312/401 |
| 6,070,293 A * | 6/2000 | Schreiber | E05D 7/1011 16/229 |
| 6,073,989 A | 6/2000 | Hilliard et al. | |
| 6,609,335 B1 * | 8/2003 | Hyakkoku | E05F 3/00 16/229 |
| 6,659,155 B1 * | 12/2003 | Mlenek | E05D 7/081 160/369 |
| 6,678,919 B1 * | 1/2004 | Sokolov | E05D 3/04 16/365 |
| 7,079,875 B2 | 7/2006 | Robertson, Jr. | |
| 7,275,670 B1 | 10/2007 | Shumack et al. | |
| 8,556,330 B2 | 10/2013 | Lazarevich et al. | |
| 8,573,818 B2 | 11/2013 | Tu et al. | |
| 8,793,935 B2 * | 8/2014 | Makarewicz | E05D 5/023 16/382 |
| 8,864,252 B1 | 10/2014 | Rodriguez Cobas et al. | |
| 9,163,442 B2 * | 10/2015 | Cox | E05D 7/04 |
| 10,202,024 B2 | 2/2019 | Rao et al. | |
| 10,316,561 B2 * | 6/2019 | Barker | E05D 5/04 |
| 10,349,784 B2 * | 7/2019 | Lieb | E05D 7/1044 |
| 2008/0235907 A1 * | 10/2008 | Wayman | E05D 7/105 16/361 |
| 2013/0081331 A1 * | 4/2013 | Vullings | E05D 7/1011 16/231 |
| 2018/0328031 A1 * | 11/2018 | Kopish | E04B 2/74 |

FOREIGN PATENT DOCUMENTS

| | | | | |
|---|---|---|---|---|
| EP | 2772605 A2 * | 9/2014 | | E05D 7/04 |
| WO | WO-2016075568 A1 * | 5/2016 | | B65D 90/008 |

* cited by examiner

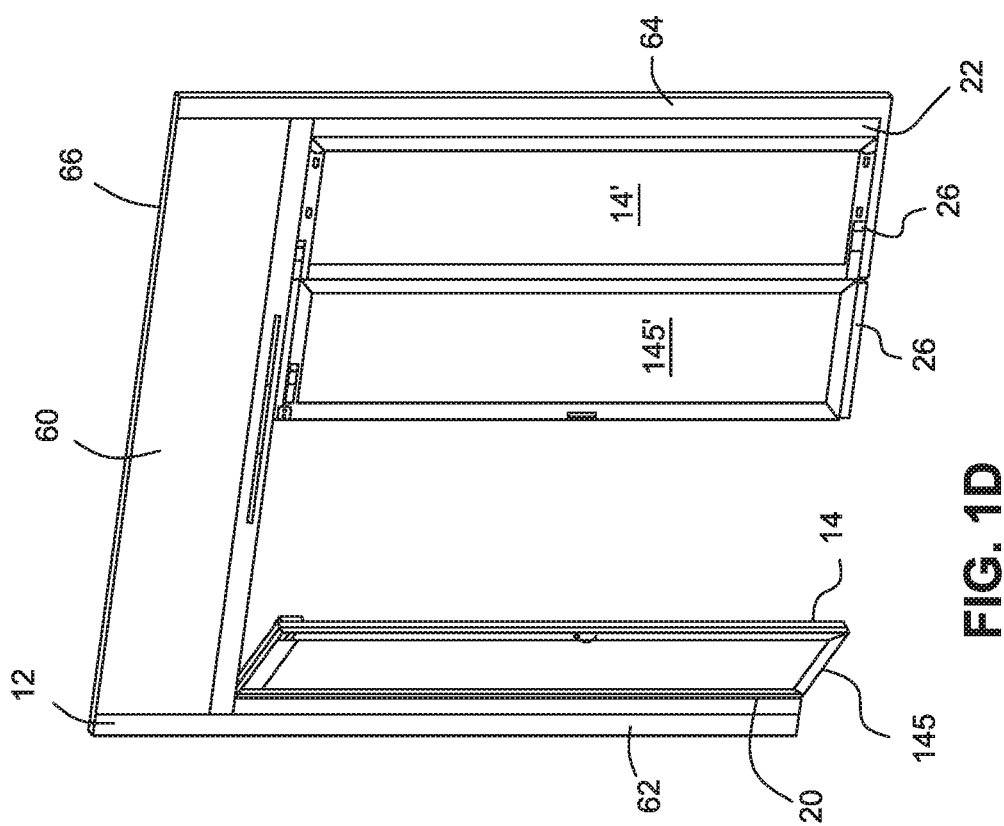
FIG. 1D
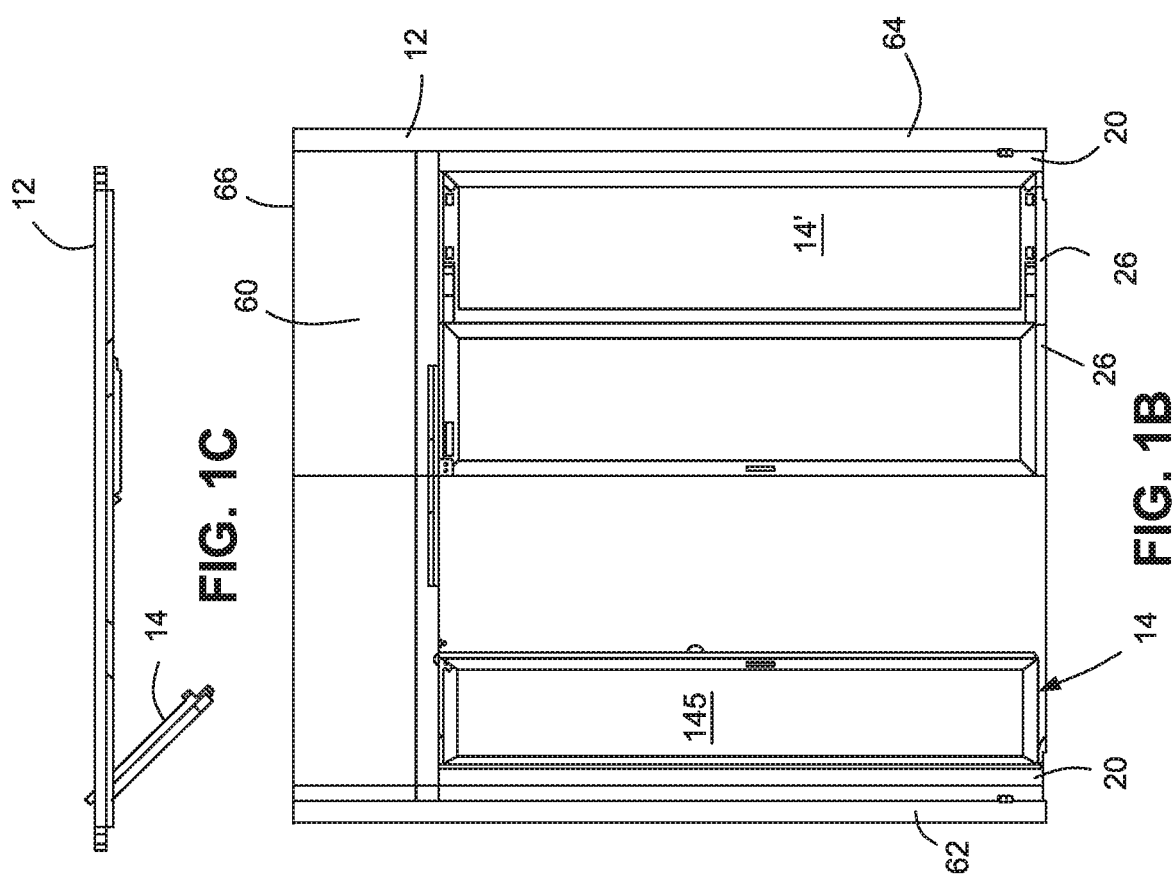
FIG. 1C
FIG. 1B

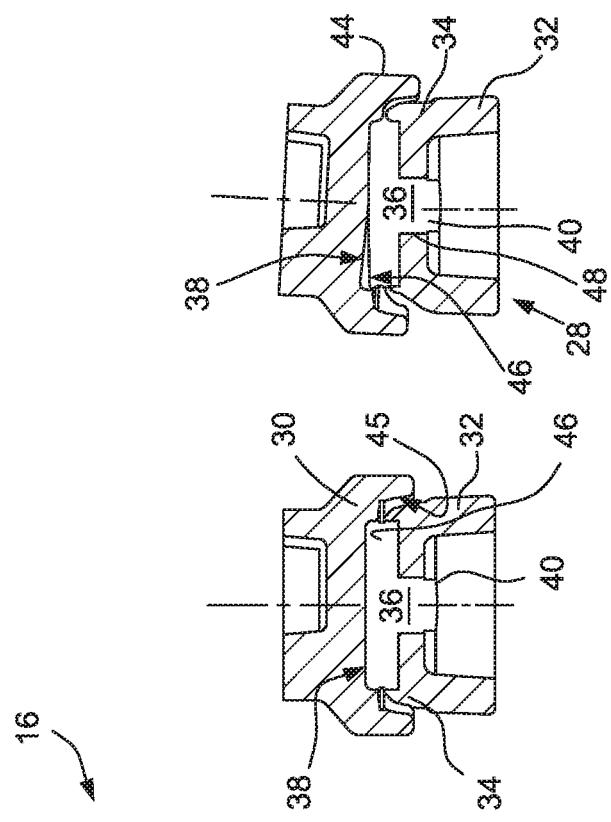
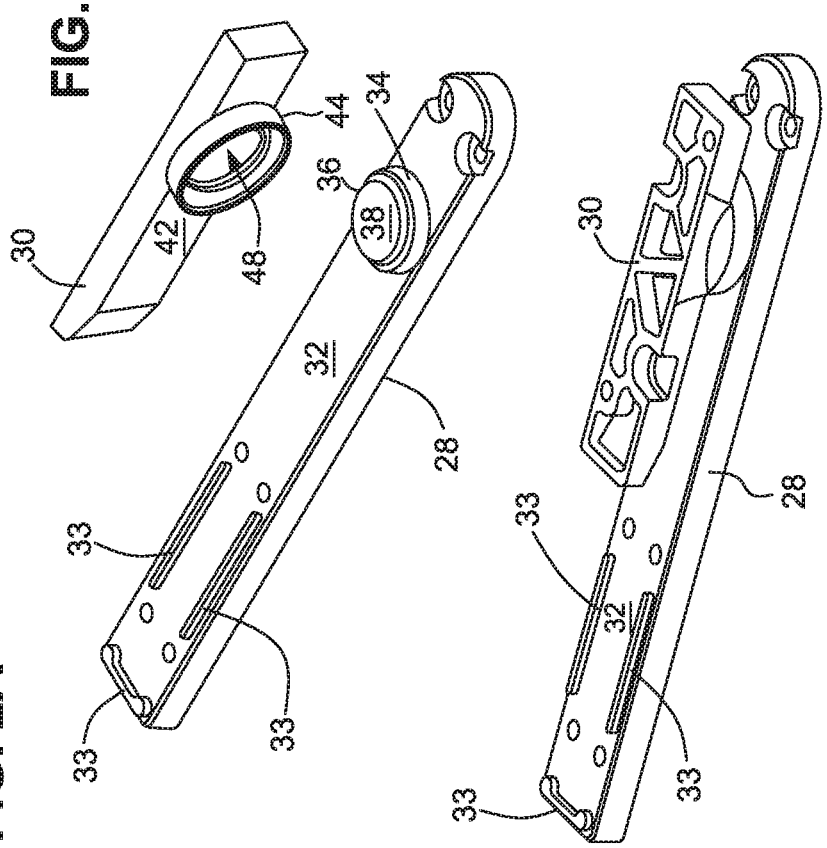
FIG. 2A  FIG. 2B  FIG. 2C  FIG. 2D  FIG. 2E

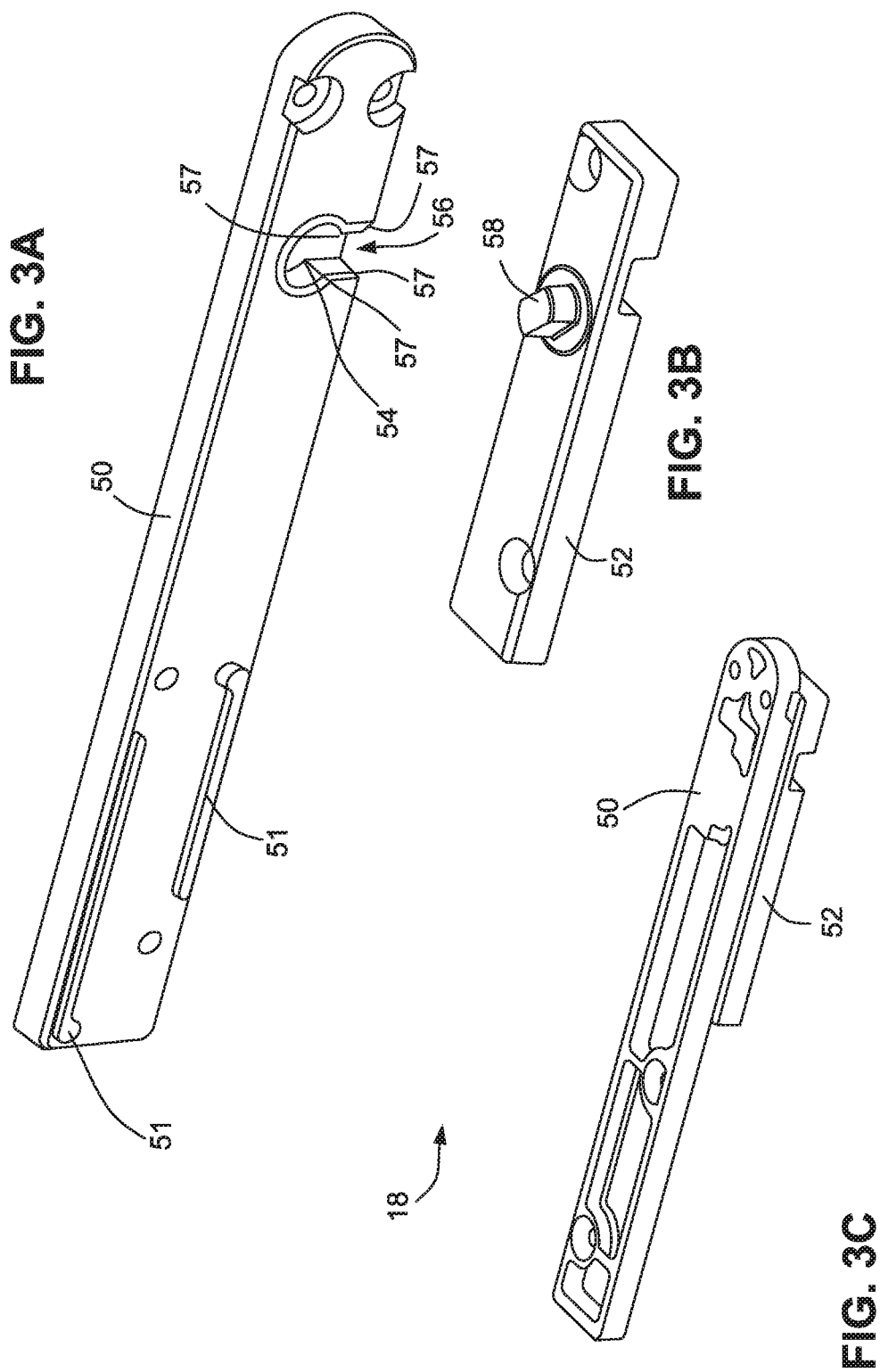

REMOVABLE DOOR AND HINGE SYSTEM THEREFOR

CROSS-REFERENCES TO RELATED APPLICATIONS

This application claims the benefit of U.S. Provisional Patent Application No. 62/631,240, filed Feb. 15, 2018, the entire content of which is herein incorporated by reference.

STATEMENT REGARDING FEDERALLY SPONSORED RESEARCH OR DEVELOPMENT (NOT APPLICABLE)

BACKGROUND

The present disclosure is directed to a pivoting door and hinge system configured to allow the pivoting door to be readily removed from a structure in which it is installed.

It may be desirable to remove a pivoting door from its hinges for repair, maintenance or replacement. With existing structures, however, it can be burdensome to remove an installed door. Installation can also be difficult, especially in tight spaces.

BRIEF SUMMARY

It thus would be desirable for a hinge system that facilitates installation and removal of a pivoting door. The hinge system according to the described embodiments includes attachments to the structural opening or door frame that are cooperative with corresponding hinge plates connected to the door. With the hinge parts at the sill end of the door in engagement, the door may be tilted into engagement by aligning and connecting the hinge parts at the header end of the door. The header end hinge parts utilize a key cooperable with a counter bore via a keyway to facilitate engagement.

In an exemplary embodiment, a hinge system is provided for a removable door having a first end and a second end. The hinge system includes a first hinge assembly cooperable with the first end of the door and a second hinge assembly cooperable with the second end of the door. The first hinge includes a first hinge plate configured for attachment to a door frame, and a second hinge plate configured for attachment to the first end of the door and for selective engagement with the first hinge plate. The first hinge plate defines a first flange and a post extending from the first flange, and the second hinge plate defines a second flange and a collar extending from the second flange. The collar is configured to selectively receive the post. The second hinge assembly includes a third hinge plate configured for attachment to the door frame, and a fourth hinge plate configured for attachment to the second end of the door and for selective engagement with the third hinge plate. The third hinge plate defines a counter bore and a keyway extending radially outwardly from the counter bore, and the fourth hinge plate defines a key configured to be selectively received in the keyway when the key is in a first predetermined orientation with respect to the keyway. The key is configured to be selectively rotatably received in the counter bore.

The second flange may define a bearing surface, and the collar may define an annulus surrounding the convex surface. The bearing surface may be convex. The post may be integrally formed with the first hinge plate. Alternatively, the post may be separately formed and post-attached to the first hinge plate. The system may also include a wear pad associated with the post, which may be inherently lubricious. The key may be integrally formed with fourth hinge plate. Alternatively, the key may be separately formed and post-attached to the fourth hinge plate.

In another exemplary embodiment, a door system having a removable door includes a door frame having a header and a sill, a door having a header end and a sill end, the first hinge assembly of the described embodiments with the first hinge plate connected to the sill and the second hinge plate connected to the sill end of the door, and the second hinge assembly of the described embodiments, with the third hinge plate connected to the header and the fourth hinge plate connected to the header end of the door.

In yet another exemplary embodiment, a hinge system is provided for a removable door in a structural opening, where the removable door has a header end and a sill end. The hinge system includes a sill side hinge pair with a first door hinge plate securable to the sill end of the removable door and a sill hinge plate securable in the structural opening. The first door hinge plate includes one of a post and a collar, and the sill hinge plate includes the other of the post and the collar, where the post and the collar are engageable and configured for relative rotation. A header side hinge pair includes a second door hinge plate securable to the header end of the removable door and a header hinge plate securable in the structural opening. The header hinge plate includes a counter bore with a keyway, and the second door plate includes key that is selectively engageable with the counter bore via the keyway.

The structural opening may include door jambs on each of opposite sides thereof, and the first and second door hinge plates may include locating flanges engageable with the door jambs. The counter bore may be circular with exception to the keyway, where the key comprises first and second parallel planar sides and first and second arcuate ends connecting the first and second planar sides. In this context, the first and second parallel planar sides may be spaced apart by a width corresponding to a width of the keyway. The first and second arcuate ends of the key may define portions of a circle complementary to the counter bore.

In still another exemplary embodiment, a method of installing a removable door in a structural opening with the hinge system of the described embodiments includes the steps of: (a) with the removable door pitched at an angle, engaging the first door hinge plate with the sill hinge plate by placing the post in the collar or by placing the collar over the post; (b) after step (a), tilting the removable door toward the structural opening and aligning the key of the second door hinge plate with the keyway of the header hinge plate; (c) displacing the key through the keyway into engagement with the counter bore; and (d) rotating the removable door. The method may further include selectively removing the removable door by rotating the removable to a predetermined position such that the key is aligned with the keyway, tilting the removable door such that the key is displaced through the keyway, thereby separating the second door hinge plate from the header hinge plate, and lifting the removable door to disengage the first door hinge plate from the sill hinge plate.

BRIEF DESCRIPTION OF THE DRAWINGS

These and other aspects and advantages will be described in detail with reference to the accompanying drawings, in which:

FIG. 1B is a front (exterior) elevation view of the system of FIG. 1A with one of the doors in an open position and the other door in a closed position;

FIG. 1C is a top plan view of the system of FIG. 1;

FIG. 1D is a perspective view of the system of FIG. 1B;

FIGS. 2A-2F are various views of a first hinge assembly according to the present disclosure; and FIGS. 3A-3D are various views of a second hinge assembly according to the present disclosure.

DETAILED DESCRIPTION

Figure 1A:
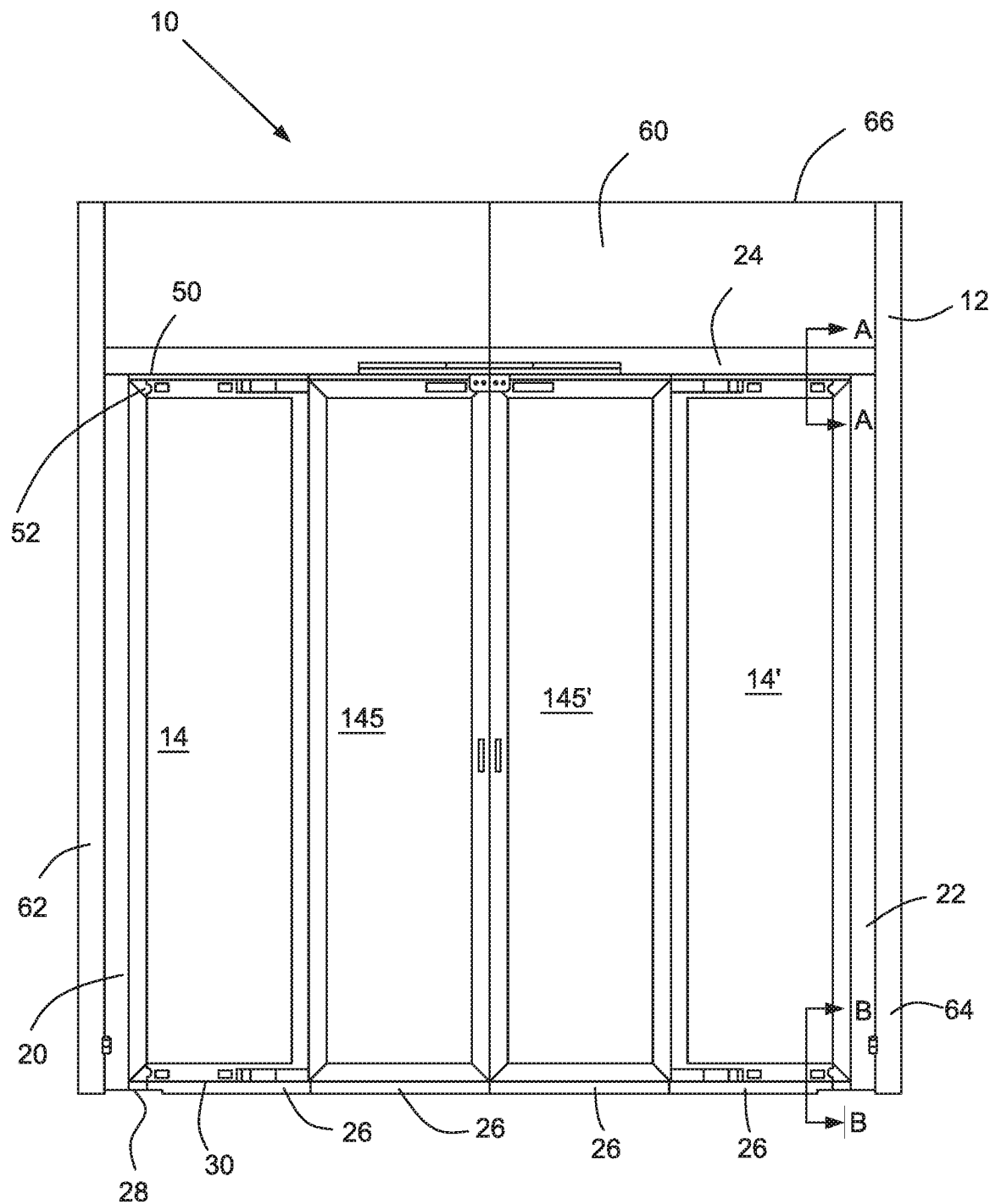
FIG. 1A is a front (exterior) elevation view of a pivoting door and hinge system having a pair of removable doors according to the present disclosure, with the doors in the closed position.

The drawings show an illustrative embodiment of a removable pivoting door and hinge system 10 according to the present disclosure. The illustrative system includes a door frame 12 and a pivoting door 14 selectively and pivotally connected to the door frame by a first hinge assembly 16 and a second hinge assembly 18. As shown, the illustrative system may also include a slidable door panel 145 slidingly engaged with the pivoting door 14.

The door frame 12 includes a first jamb 20, a second jamb 22, and a header 24. In an embodiment, the frame also could include a sill (not shown). The frame 12 is configured for installation into an opening in a wall of a structure, for example, a recreational vehicle or other vehicular structure. In some embodiments, where the frame lacks a sill, the floor of the structure could serve as a sill. The door 14 has a sill end opposite the header 24 and a header end proximate the header. A threshold seal 26 may be provided between the sill and the sill end of the door 14. For example, the threshold seal 26 may be connected to and extend from the sill end of the door 14.

Figure 2F:
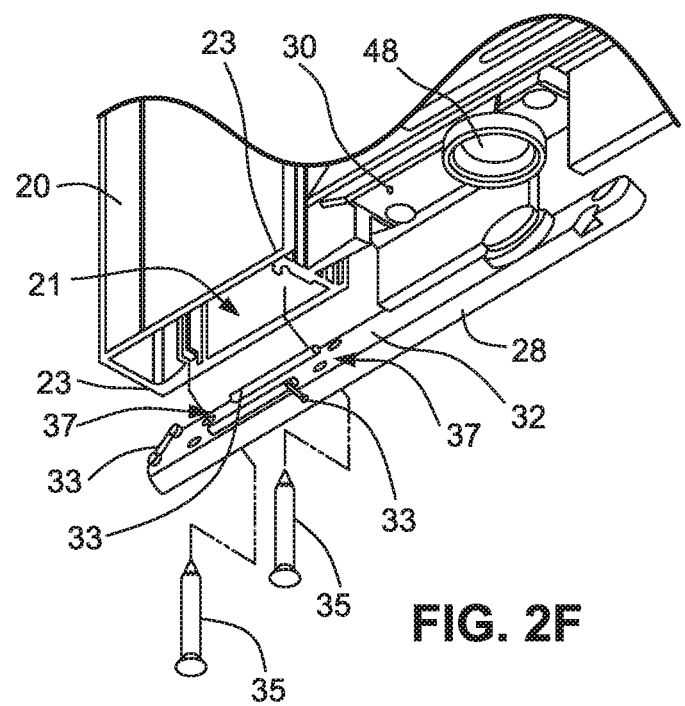

The first jamb 20 includes a sill end opposite the header 24, and a header end proximate the header. As best shown in FIGS. 2A-2F, the first hinge assembly 16 includes a first hinge plate 28 connected or connectable to the sill end of the first jamb 20 and a second hinge plate 30 connected or connectable to the sill end of the door 14.

The first hinge plate 28 includes a first flange 32 having a first surface and a second surface opposite the first surface. As shown, one or more optional locating features 33 may extend from the second surface of the first flange 32 in a direction away from the first surface. The locating features 33 may facilitate installation of the first hinge plate 28 to the first jamb 20 of the door frame 12. For example, as shown, the first jamb 20 may be embodied as a tubular, rectangular extrusion having four side walls cooperating to define an interior space 21. The locating features 33 may be configured to be received within the interior space when the first flange 32 is abutted against the open sill end of the first jamb 20. The locating features 33 may further be configured to substantially abut the sidewalls of the first jamb 20 defining the interior space 21. The first jamb 20 may further define screw bosses 23 configured to receive screws 35 or other fasteners extending through corresponding apertures 37 defined by the first flange 32.

A cylindrical post 34 extends from the second surface of the first flange 32 in a direction away from the first surface. The post 34 has a first outer diameter and extends a first distance or height from the second surface of the first flange 32. The post 34 may be integrally formed with the first flange 32. Alternatively, the post 34 may be formed separate and apart from the first flange 32 and post-attached thereto.

As shown, the post 34 may receive a wear pad 36 having a circular wear surface 38 concentric with the post 34. The wear pad 36 or wear surface 38 thereof has a second diameter smaller than the first diameter. The wear pad 36 or wear surface thereof may be made of a material selected to facilitate pivoting of the first hinge plate 28 with respect to the second hinge plate 30, as will be discussed further below. For example, the wear pad 36 or wear surface 38 may be made of an inherently lubricious material and/or a material having good pivotal wear properties. The wear pad 36 may have a mounting shaft 40 extending from the wear pad in a direction away from the wear surface 38. The post 34 may define one or more countersunk portions and/or apertures configured to receive the wear pad 36 and mounting shaft 40 thereof. In an embodiment, the post 34 and the wear pad 36 may be embodied as a single element.

The second hinge plate 30 includes a second flange 42 having a first surface configured for connection to the sill end of the door 14 and an annular collar 44 extending from the second flange 42 in a direction away from the first surface of the second flange 42. The collar 44 defines an interior wall surface 45 that may be square or that may be tapered outwardly toward the open end of the collar 44. The collar 44 thus has a first inner diameter or range of first inner diameters that may vary from a relatively large diameter near the free end of the collar to a relatively small diameter near the end of the collar extending from the second flange 42. The collar 44 extends a second distance or height from the corresponding surface of the second flange 42. The first inner diameter or range of first inner diameters of the collar 44 is complementary to the first outer diameter of the post 34. Similarly, the second height of the collar 44 is complementary to the first height of the post 34. As shown, the collar 44 may define a countersunk portion 46 having a second inside diameter. The countersunk portion 46 may be configured to selectively receive the wear pad 36. The second hinge plate 30 defines a bearing surface 48 contained within the countersunk portion 46 of the collar 44. As shown, the bearing surface 48 may be convex, for example, spherically convex. In an embodiment, the bearing surface 48 may be planar.

As shown, the countersunk portion 46 may be configured to selectively receive at least a portion of the wear pad 36, with the wear surface 38 of the wear pad in bearing engagement with the bearing surface 48 of the second hinge member 30. The collar 44 may be configured to selectively receive at least a portion of the post 34.

Figure 3D:
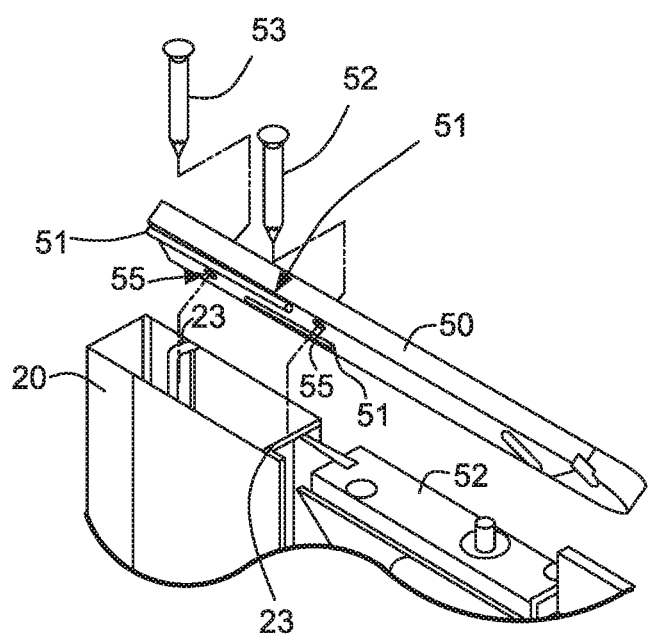

As best shown in FIGS. 3A-3D, the second hinge assembly 18 includes a third hinge plate 50 connected or connectable to the header end of the first jamb 20 and a fourth hinge plate 52 connected or connectable to the header end of the door 14. The third hinge plate 50 has a first end, a second end opposite the first end, a first side, a second side opposite the first side, a first surface, and a second surface opposite the first surface. As shown, one or more optional locating features 51 may extend from the second surface of the third hinge plate 50 in a direction away from the first surface. The locating features 51 may facilitate installation of the third hinge plate 50 to the first jamb 20 of the door frame 12. For example, the locating features 51 may be configured to be received within the interior space when the first surface of the third hinge plate 50 is abutted against the open header end of the first jamb 20. The locating features 51 may further be configured to substantially abut the sidewalls of the first jamb 20 defining the interior space 21. Screws 53 or other fasteners extending through corresponding apertures 55 defined by the third hinge plate 50 may be received in the screw bosses 23 to connect the third hinge plate 50 to the header end of the first jamb 20.

The third hinge plate 50 defines a counter bore 54 proximate the first end thereof. The counter bore 54 extends inwardly from the second surface of the third hinge plate 50 toward or to the first surface of the third hinge plate 50. A keyway 56 extends radially from the counter bore 54 to the first side of the third hinge plate 50. The keyway 56 extends inwardly from the second surface of the third hinge plate 50 toward or to the first surface of the third hinge plate 50. The keyway 56 has a first width. The inboard end of the keyway 56 (the end adjacent the counter bore 54) and/or the outboard end of the keyway (the end opposite the counter bore 54) may define one or more beveled or chamfered edges 57 to facilitate receipt of a key therein, as will be discussed further below.

The fourth hinge plate 52 has a first end, a second end opposite the first end, a first side, a second side opposite the first side, a first surface that may abut the header end of the door 14 when the third hinge plate is attached thereto, and a second surface opposite the first surface. A key 58 extends outwardly from the second surface of the fourth hinge plate 52, in a direction away from the first surface thereof. The key 58 is in the form of a cylinder with portions extending radially outwardly from parallel chords thereof omitted. As such, the key 58 is defined by first and second parallel planar sides or flats and first and second arcuate ends connecting the first and second planar sides. The first and second parallel sides are spaced apart by a width complementary to the width of the keyway 56. As such, the key 58 may be readily passed through the keyway 56 when aligned therewith. The first and second arcuate ends define portions of a circle complementary to (i.e., slightly smaller than) the counter bore 54. As such, the key 58 may be readily pivoted within the counter bore 54 when the key is received therein. The key 58 may be integrally formed with the fourth hinge plate 52, or it may be formed separately and post-attached to the fourth hinge plate.

In use, the first hinge plate 28 is connected to the sill of the door frame 12, the second hinge plate 30 is connected to the sill end of the door, the third hinge plate 50 is connected to the header of the door frame 12, and fourth hinge plate 52 is connected to the header end of the door. The door 14 may be installed to the frame 12 by placing the collar 44 over the post 34. This step may be facilitated with the balance of the door 14 tilted outwardly from the door frame 12. The door 14 may then be tilted toward the frame 12 so that the key 58 is received within the keyway 56 and then within the counter bore 54. The chamfers 57 may facilitate receipt of the key 58 within the keyway 56. With the key 58 inserted into the counter bore 54, the second hinge plate 30, the fourth hinge plate 52, and the door 14 may be freely rotated with respect to the first hinge plate 28, the third hinge plate 50 and the door frame 12, respectively.

The door 14 may be removed from the frame by the reverse process.

The second hinge assembly 18 may be configured to enable removal and installation of the door 14 from the frame 12 with the door in any desired predetermined pivotal position with respect to the frame. In an embodiment, the predetermined pivotal position comprises the door 14 pivoted about 45° open with respect to the frame 12. In other embodiments, the predetermined pivotal position could comprise the door 14 pivoted about anywhere in a range between about 30° and 60° open with respect to the frame 12 or anywhere in a range between about 10° open and 80° open with respect to the frame 12.

In an embodiment, the pivoting door 14 is associated with the frame 12 so that the weight of the door tends to preclude the door from becoming spuriously disconnected from the frame.

More specifically, the second hinge assembly 18 is configured and connected to the door 14 and the frame 12 so that the weight of the door tends to keep the key 58 engaged with the counter bore 54 and out of the keyway 56. That is, the keyway 56 extends to the side of the third hinge plate 50 opposite the side of the third hinge plate from which the door 14 swings.

As shown, the illustrative system 10 may include an optional sliding door 145 slidingly engaged with the pivoting door 14. Where provided, the sliding door 145 has a sill end and header end corresponding to the sill end and header end of the pivoting door 14. A further threshold seal 26 may be connected to and extend from the sill end of the sliding door 145.

Also, the illustrative system 10 may include a further pivoting door 14' associated with the frame 12. A further sliding door 145' may be associated with the further pivoting door 14'. The second pivoting door 14' and the second sliding door 145' may be the mirror image of the pivoting door 14 and the sliding door 145. As such, the second pivoting door 14' and the second sliding door 145' will not be discussed in further detail herein.

The system 10 may be assembled by connecting the first and second hinge assemblies 16, 18 and the pivoting door 14 to the first jamb 20. In embodiments including the sliding door 145, the sliding door may be connected to the pivoting door 14. In embodiments including the second pivoting door 14', the second pivoting door and hinge assemblies corresponding to the first and second hinge assemblies 16, 18 may be connected the second jamb 22 in the same manner that the pivoting door 14 and the first and second hinge assemblies are connected to the first jamb 20. The header 24 may be connected between the header ends of the first and second jambs 20, 22.

In an embodiment, an additional header panel 60 provided for installation above the header 24 could be omitted. In another embodiment, the header 24 could be omitted.

First and second wall brackets 62, 64 may be provided to facilitate installation of the system 10 into a structure. The first and second wall brackets 62, 64 could be embodied as extrusions having features complementary to and configured to receive and/or engage with exterior features of the first and second jambs 20, 22 of the frame 12. The first wall bracket 62 may be screwed or otherwise connected to a first jamb of a structure into which the system 10 is to be installed, and the second wall bracket 64 could be similarly connected to a second jamb of the structure.

A ceiling trim panel 66 may be connected to the ceiling of the structure.

If provided, the additional header panel 60 may be connected to the wall brackets 62, 64 and the ceiling trim panel 66.

The header 24 may be positioned against the ceiling of the structure or against the additional header panel 60, if provided.

The first and second jambs 20, 22 of the frame 12 may be connected, respectively, to the first and second wall brackets 62, 64.

The header 24 may be connected to the header ends of the first and second jambs 20, 22.

The first and third hinge plates 28, 50 may be further connected, respectively, to the sill and header of the opening in the structure in which the system 10 is installed.

In an embodiment, the door frame 12 may be omitted as a distinct structure, and the opening in the wall of the structure could serve as a frame. In such an embodiment, the first and third hinge plates 28, 50 could be connected to the sill and header (or to the jambs) of the structure in any suitable manner instead of to the frame 12.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A hinge system for a removable door having a first end and a second end, the hinge system comprising:
    a first hinge assembly comprising:
        a first hinge plate configured for attachment to a door frame, and
        a second hinge plate configured for attachment to the first end of the door and for selective engagement with the first hinge plate, the first hinge plate defining a first flange and a post extending from the first flange, and the second hinge plate defining a second flange and a collar extending from the second flange, the collar configured to selectively receive the post; and
    a second hinge assembly comprising:
        a third hinge plate configured for attachment to the door frame, and
        a fourth hinge plate configured for attachment to the second end of the door and for selective engagement with the third hinge plate, the third hinge plate defining a counter bore and a keyway extending radially outwardly from the counter bore, and the fourth hinge plate defining a key configured to be selectively received in the keyway when the key is in a first predetermined orientation with respect to the keyway and further configured to be selectively rotatably received in the counter bore.

2. The system of claim 1, wherein the second flange defines a bearing surface, and wherein the collar defines an annulus surrounding the bearing surface.

3. The system of claim 2, wherein the bearing surface is convex.

4. The system of claim 1, wherein the post is integrally formed with the first hinge plate.

5. The system of claim 1, wherein the post is separately formed and post-attached to the first hinge plate.

6. The system of claim 1, further comprising a wear pad associated with the post.

7. The system of claim 6, wherein the wear pad is inherently lubricious.

8. The system of claim 1, wherein the key is integrally formed with fourth hinge plate.

9. The system of claim 1, wherein the key is separately formed and post-attached to the fourth hinge plate.

10. A door system having a removable door, the door system comprising:
    a door frame having a header and a sill;
    a door having a header end and a sill end;
    a first hinge assembly as recited in claim 1, the first hinge plate connected to the sill and the second hinge plate connected to the sill end of the door; and
    a second hinge assembly as recited in claim 1, the third hinge plate connected to the header and the fourth hinge plate connected to the header end of the door.

11. A hinge system for a removable door in a structural opening, the removable door having a header end and a sill end, the hinge system comprising:
    a sill side hinge pair including a first door hinge plate securable to the sill end of the removable door and a sill hinge plate securable in the structural opening, the first door hinge plate including one of a post and a collar, and the sill hinge plate including the other of the post and the collar, wherein the post and the collar are engageable and configured for relative rotation; and
    a header side hinge pair including a second door hinge plate securable to the header end of the removable door and a header hinge plate securable in the structural opening, the header hinge plate including a counter bore with a keyway, and the second door hinge plate including key that is selectively engageable with the counter bore via the keyway.

12. The system of claim 11, wherein the structural opening includes door jambs on each of opposite sides thereof, and wherein the sill hinge plate and the header hinge plate comprise locating flanges engageable with the door jambs.

13. The system of claim 11, wherein the counter bore is circular with exception to the keyway, wherein the key comprises first and second parallel planar sides and first and second arcuate ends connecting the first and second planar sides, and wherein the first and second parallel planar sides are spaced apart by a width corresponding to a width of the keyway.

14. The system of claim 13, wherein the first and second arcuate ends of the key define portions of a circle complementary to the counter bore.

15. A method of installing a removable door in a structural opening with the hinge system according to claim 11, the method comprising:
    (a) with the removable door pitched at an angle, engaging the first door hinge plate with the sill hinge plate by placing the post in the collar or by placing the collar over the post;
    (b) after step (a), tilting the removable door toward the structural opening and aligning the key of the second door hinge plate with the keyway of the header hinge plate;
    (c) displacing the key through the keyway into engagement with the counter bore; and
    (d) rotating the removable door.

16. A method according to claim 15, further comprising selectively removing the removable door by rotating the removable door to a predetermined position such that the key is aligned with the keyway, tilting the removable door such that the key is displaced through the keyway, thereby separating the second door hinge plate from the header hinge plate, and lifting the removable door to disengage the first door hinge plate from the sill hinge plate.

* * * * *